(12) United States Patent
Boscolo et al.

(10) Patent No.: US 9,257,920 B2
(45) Date of Patent: Feb. 9, 2016

(54) METHOD AND RELATED DRIVER OF A PERMANENT MAGNET SYNCHRONOUS ELECTRIC MOTOR

(71) Applicant: STMICROELECTRONICS S.r.l., Agrate Brianza (IT)

(72) Inventors: Michele Berto Boscolo, Sesto San Giovanni (IT); Federico Magni, Settimo Milanese (IT); Paolo Pascale, Rho (IT); Ezio Galbiati, Agnadello (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 89 days.

(21) Appl. No.: 14/327,048

(22) Filed: Jul. 9, 2014

(65) Prior Publication Data

US 2015/0022128 A1  Jan. 22, 2015

(30) Foreign Application Priority Data

Jul. 19, 2013 (IT) .............................. MI13A001214

(51) Int. Cl.
 *H02P 6/08* (2006.01)
 *H02P 6/00* (2006.01)
 *H02P 6/18* (2006.01)
(52) U.S. Cl.
 CPC ............... *H02P 6/002* (2013.01); *H02P 6/001* (2013.01); *H02P 6/085* (2013.01); *H02P 6/182* (2013.01)
(58) Field of Classification Search
 CPC .................................... H02P 6/08; H02P 6/10
 USPC ............ 318/400.01, 400.04, 400.12, 400.14, 318/400.15, 400.32, 400.34, 700, 720–724
 See application file for complete search history.

(56) References Cited

U.S. PATENT DOCUMENTS

| 5,534,763 A * | 7/1996 | Williams ................ H02P 6/085 318/400.13 |
| 6,137,253 A | 10/2000 | Galbiati et al. |
| 6,150,963 A | 11/2000 | Boscolo et al. |
| 6,392,418 B1 * | 5/2002 | Mir ........................ B62D 5/046 318/716 |

(Continued)

FOREIGN PATENT DOCUMENTS

| EP | 0800262 | 10/1997 |
| EP | 0800263 | 10/1997 |

(Continued)

OTHER PUBLICATIONS

Oboe et al., "Realization of a hard disk drive head servo-positioning system with a voltage-driven voice-coil motor", Microsystem Technologies 9, 2003, pp. 271-281.

*Primary Examiner* — Bentsu Ro
(74) *Attorney, Agent, or Firm* — Allen, Dyer, Doppelt, Milbrath & Gilchrist, P.A.

(57) ABSTRACT

A method of driving a permanent magnet synchronous electric motor includes sensing or estimating a back electromotive force induced in at least a winding of the motor by the rotation of a rotor of the motor; and reading, from a memory, values of a first voltage waveform having a phase angle with respect to the back electromotive force. The method also includes generating a driving voltage corresponding to the sum of values of a control voltage, obtained as product of the values of the first voltage waveform by a first coefficient determined as a function of a desired value of motor torque, and values of a cancelation voltage of the back electromotive force. The method also includes applying the driving voltage at the motor winding.

22 Claims, 12 Drawing Sheets

(56) References Cited

U.S. PATENT DOCUMENTS

| | | | |
|---|---|---|---|
| 6,549,871 B1 * | 4/2003 | Mir | B62D 5/0481 702/145 |
| 7,834,568 B2 | 11/2010 | Galbiati et al. | |
| 2009/0026990 A1 | 1/2009 | Galbiati et al. | |
| 2010/0289445 A1 | 11/2010 | Bagarelli et al. | |

FOREIGN PATENT DOCUMENTS

| | | |
|---|---|---|
| EP | 0809349 | 11/1997 |
| EP | 1630070 | 3/2006 |

* cited by examiner

METHOD AND RELATED DRIVER OF A PERMANENT MAGNET SYNCHRONOUS ELECTRIC MOTOR

FIELD OF THE INVENTION

This invention relates to techniques for driving electric motors, and, more particularly, to a method of driving and a related driver of a permanent magnet synchronous electric motor.

BACKGROUND

Electrically switched DC motors, such as stepper motors or more generally brushless motors, are used in numerous control and regulation applications and also in systems for driving mass memory devices such as hard disks, floppy disks, optical disks, CD-ROMs, etc.

Hereinafter reference will be made to a three-phase electric motor, though the same observations also hold for a generic poly-phase motor.

Figure 1:
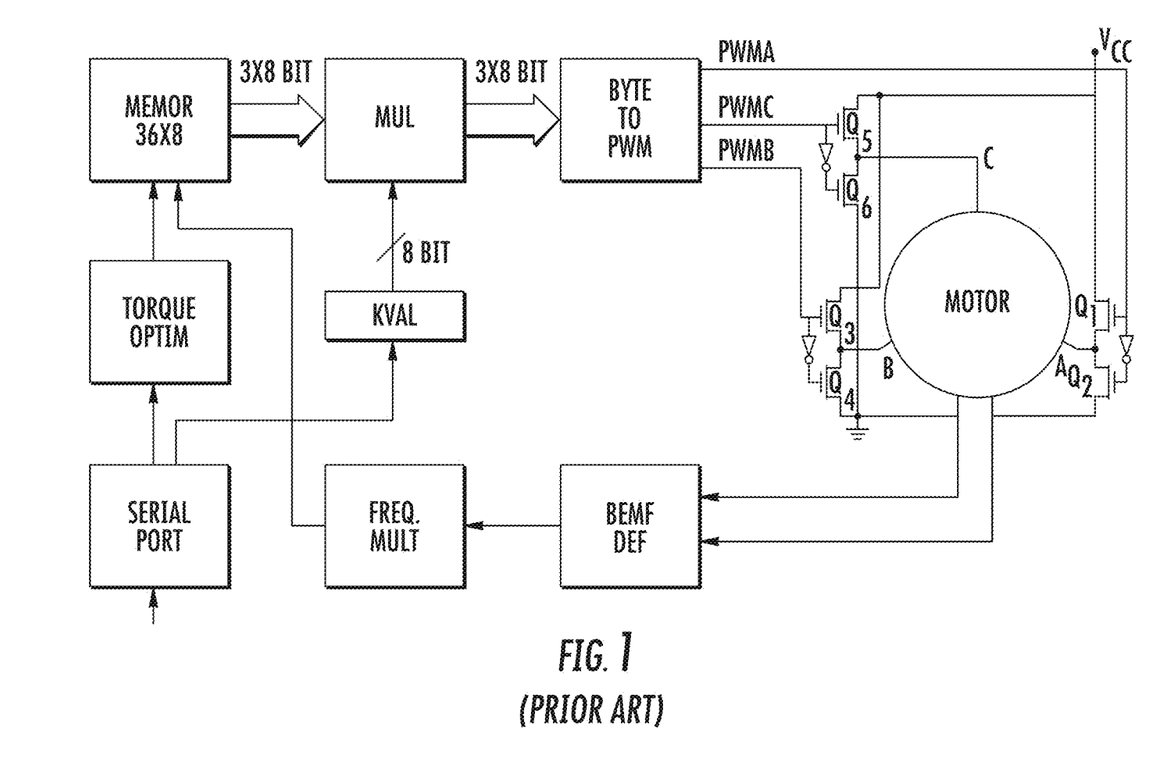
FIG. 1 shows a high level scheme of a smooth driver as in the prior art.

Brushless motors may be driven using an integrated circuit, commonly called "smooth driver", of the type shown in FIG. 1 and illustrated in the document US 2009/0026990 herein incorporated by reference in its entirety. The output stage is represented by a full-wave bridge circuit that, in the case of a three-phase motor, uses six bipolar (BJT) or field effect (MOS) power transistors, as shown in the figure.

Typically, a brushless motor is driven by properly supplying the phases of the motor synchronously with the instantaneous position of the motor. This may be done by energizing sequentially two windings of the motor with positive and negative voltages, respectively, leaving a third winding in a high impedance state. When a brushless "sensorless" motor is driven, the not energized winding is exploited for sensing the position of the rotor. The driving voltages or currents applied to the motor windings, instead of having a pre-established constant level during each switching phase, have a certain digitized pre-established (non constant) driving voltage or current waveform stored in a nonvolatile static memory device, for example, in an EPROM or EEPROM memory.

Figure 2:
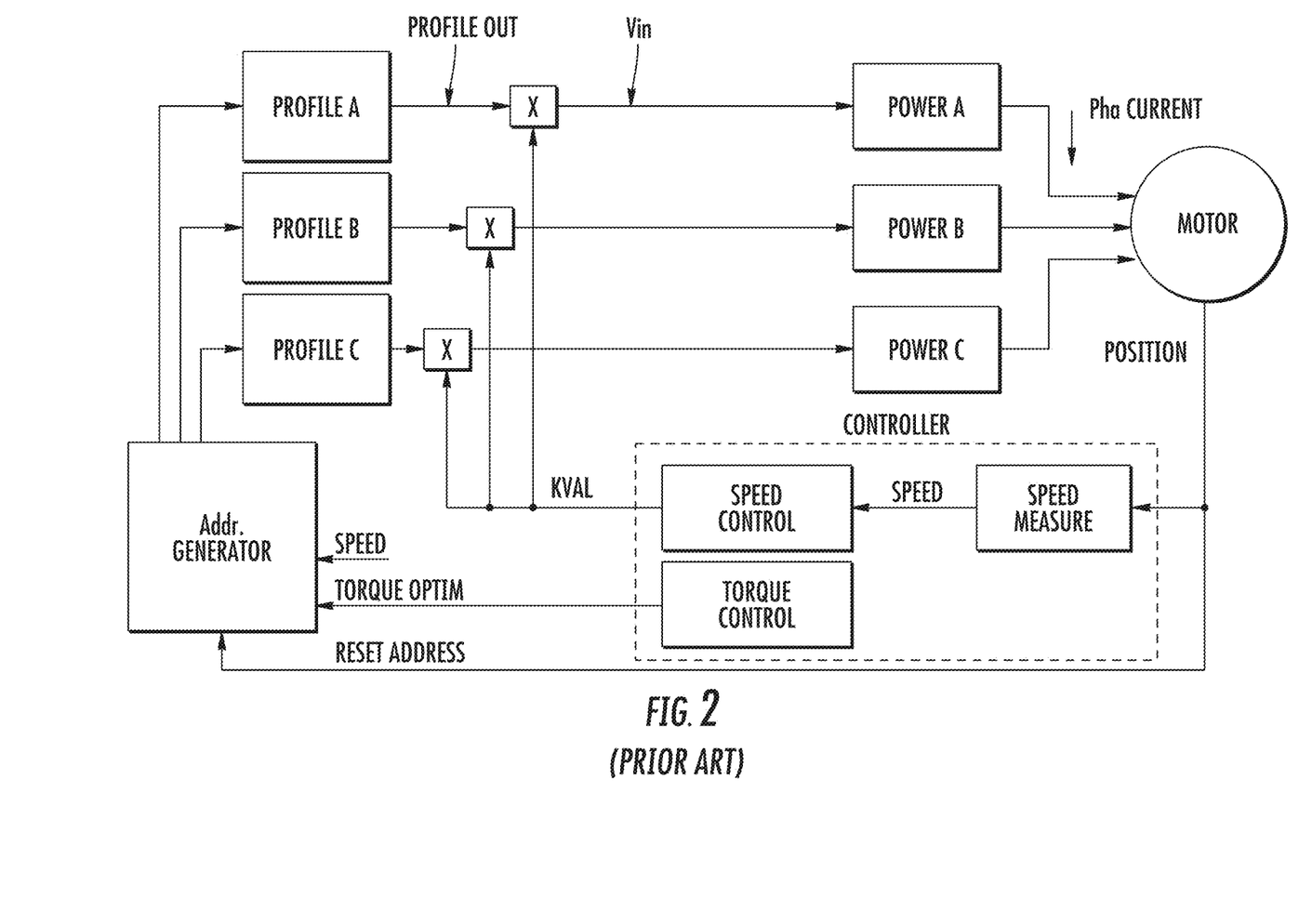
FIG. 2 shows a scheme of a prior art driver in which only the relevant blocks for the present invention are shown.

This technique is well known in the art, for example from the European patents EP 800262, EP 800263, EP 809349 and from U.S. Pat. No. 6,137,253 the disclosures of which are herein incorporated by reference in their entireties, and for this reason will not be illustrated further. A basic scheme of the driver is depicted in FIG. 2, in which the functional blocks and the indicated signals have the meaning listed in the following table:

| Profile A | Memory device storing the voltage waveform for winding A |
| --- | --- |
| Profile B | Memory device storing the voltage waveform for winding B |
| Profile C | Memory device storing the voltage waveform for winding C |
| Power A | Half-bridge for driving winding A |
| Power B | Half-bridge for driving winding B |
| Power C | Half-bridge for driving winding C |
| Motor | Motor |
| Position | Position signal of the rotor |
| Controller | Control circuit |
| Speed Measure | Circuit for measuring the rotor speed starting from the signal of the rotor position |
| Speed | Rotor speed |
| Speed Control | Control circuit of the rotor speed |
| Torque Control | Motor torque optimization circuit |

-continued

| KVAL | Signal proportional to a desired value of motor torque |
| --- | --- |
| Addr. Generator | Generator of memory addresses for reading waveforms |
| Torque Optim | Phase angle (start of a reading from the memory) in respect to the BEMF of a voltage Vin applied to a winding |
| Reset address | Start signal for reading a waveform from the memory for obtaining a synchronous waveform with the rotor position |
| Profile Out | Voltage waveform read from the memory |
| Vin | Control voltage |
| PhA current | Phase current in winding A |

In order to properly supply the windings, the position and speed of the rotor of the motor are determined with a feedback circuit for sensing or estimating the back electromotive force (BEMF) induced in the tristated winding.

The driver allows a voltage mode driving typically used for permanent magnet synchronous motors PMSM because it is simpler than current mode driving. The values KVAL and Torque Optim are provided as inputs; and, as a function thereof, a phase voltage Vin to be applied at the motor windings is generated. In order to make the applied voltage independent from eventual fluctuations of the supply voltage of the motor, closed-loop compensation methods may be used as well as open-loop systems with feed-forward compensation. An example of feed-forward compensation is described in the U.S. Pat. No. 6,150,963 in the name of the same applicant, herein incorporated by reference in its entirety.

Figure 3A:
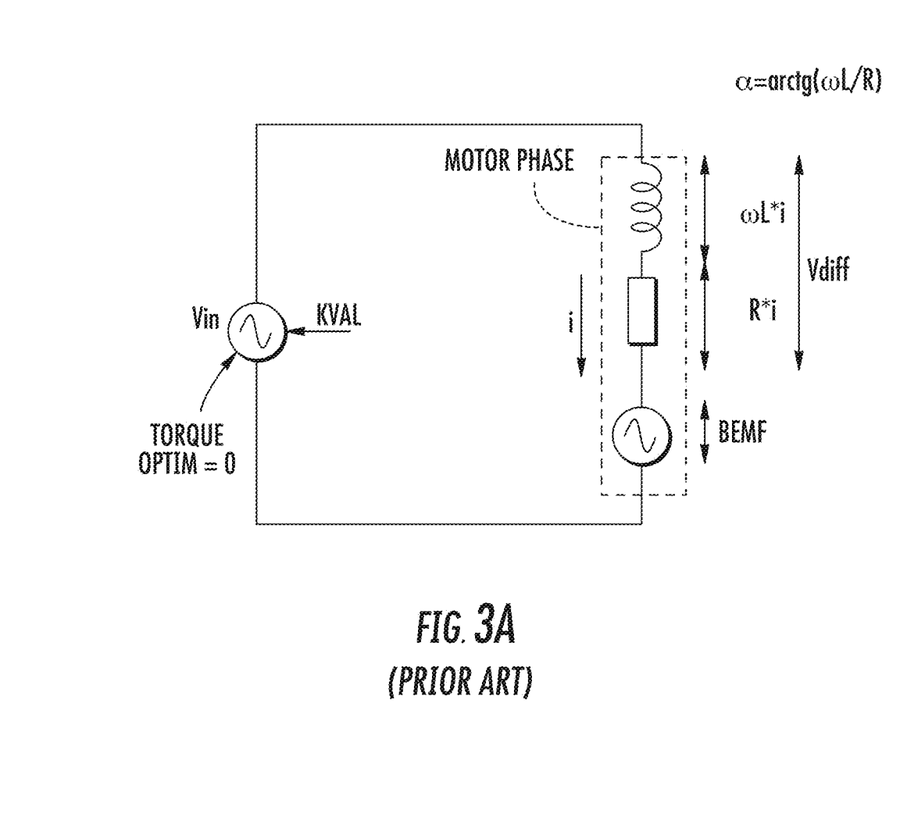
FIGS. 3a and 3b show respectively a basic electric scheme of a known driver of a PMSM motor winding and the related phasor diagram when the voltage Vin applied at the winding is in phase with the induced BEMF.
Figure 3B:
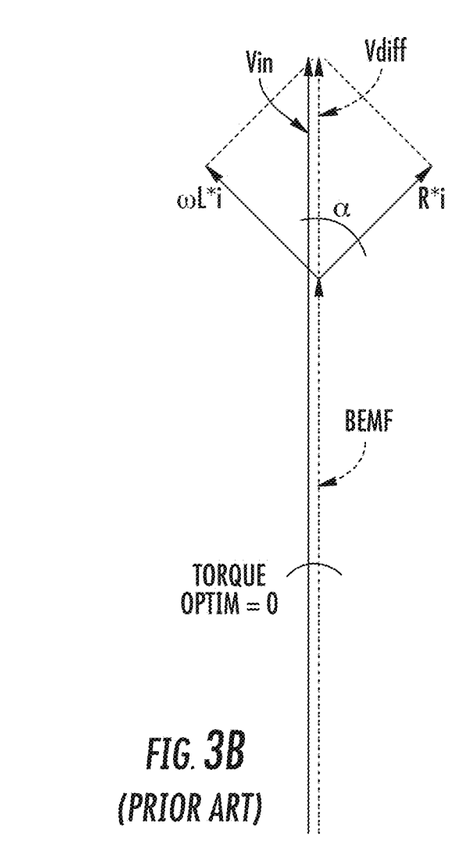
Figure 4A:
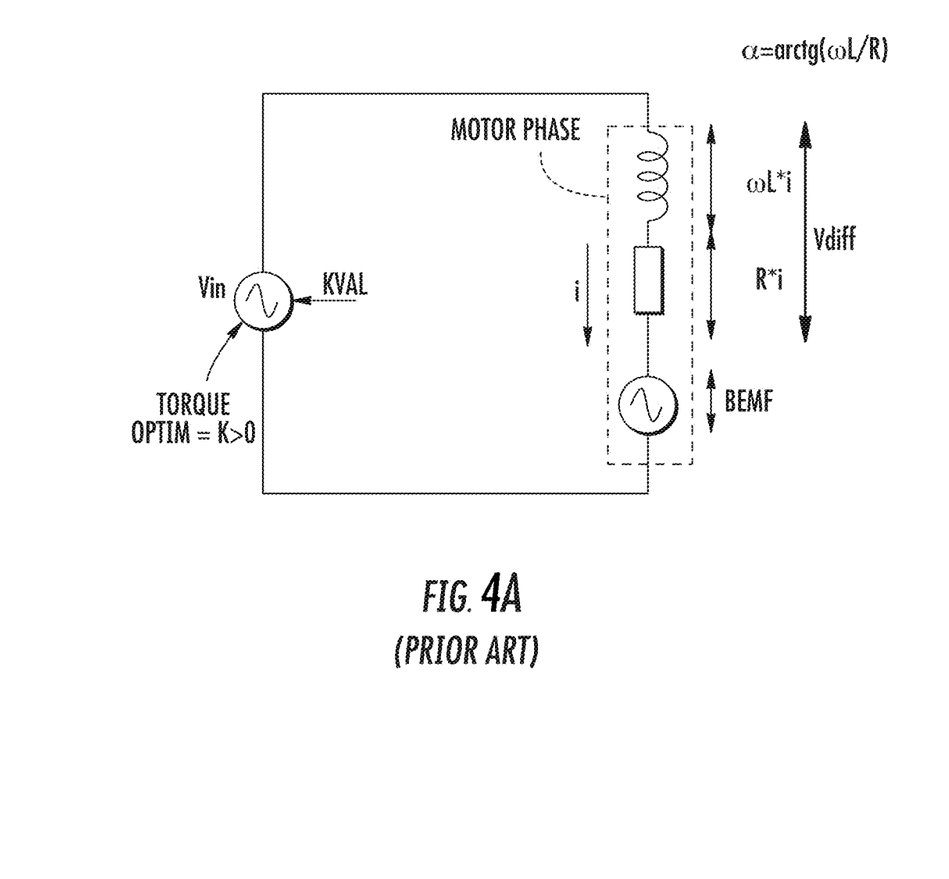
FIGS. 4a and 4b show respectively a prior art scheme of the powering circuit of a PMSM motor winding and the related phasor diagram when the voltage Vin applied at the winding is leading such to make the current i through the winding in phase with the induced BEMF (maximum efficiency).
Figure 4B:
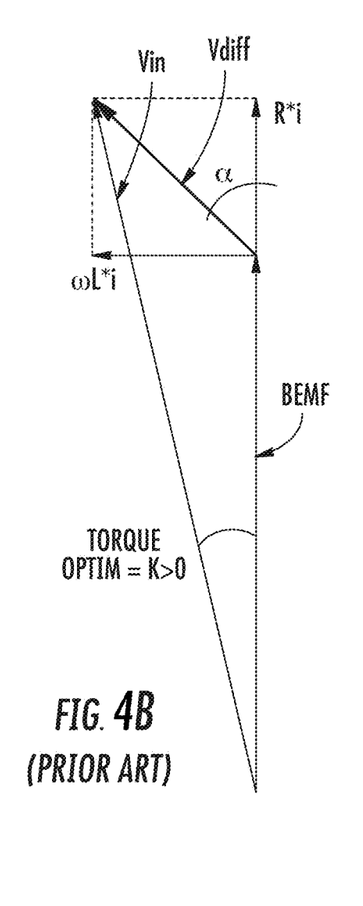
Figure 5A:
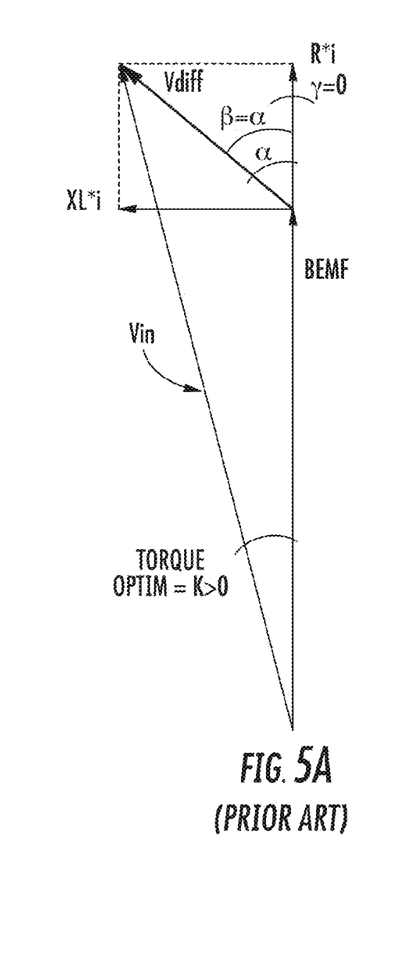
FIGS. 5a, 5b and 5c show phasor diagrams respectively during a stationary condition of maximum efficiency, during a transient condition that requires a torque increase and during a transient condition that requires a torque reduction as in the prior art.
Figure 5B:
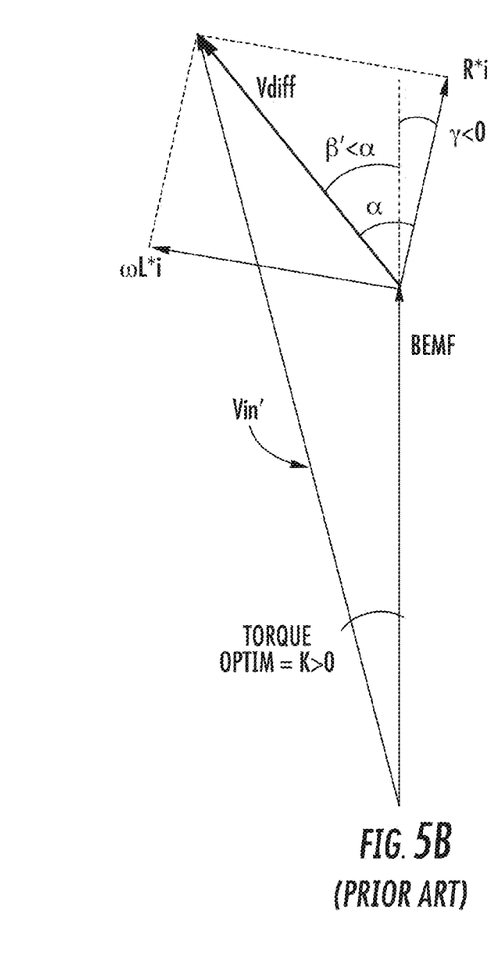
Figure 5C:
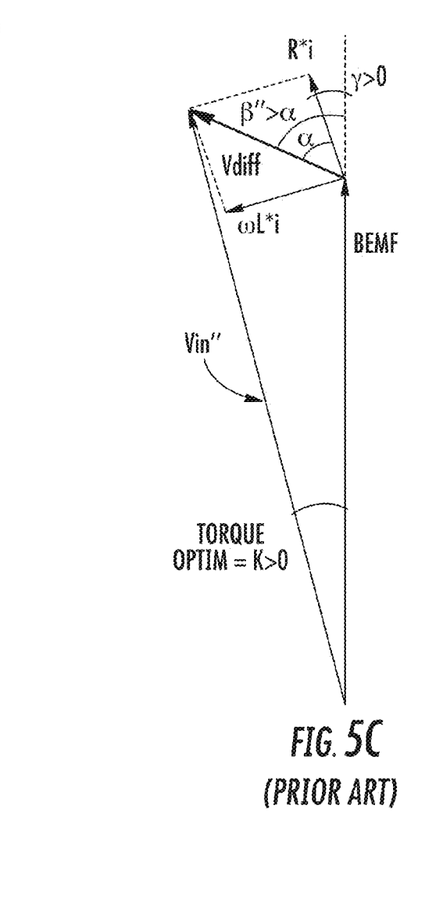

Considering purely sinusoidal or pseudo-sinusoidal (i.e. step waveforms that approximate sinusoidal waveforms) phase voltages, the driving of each winding of the electric motor is fully described by the phasors of FIGS. 3, 4 and 5, the labels having the following meaning:

| Torque Optim | Phase angle (start of a reading from the memory) in respect to the BEMF of a voltage Vin applied to a winding |
| --- | --- |
| KVAL | Signal proportional to a desired value of motor torque |
| BEMF | Back electromotive force induced by the rotation of the motor |
| R | Resistance of the winding |
| L | Inductance of the winding |
| I | Phase current flowing throughout the winding |
| Vin | Control voltage of the winding |
| Vdiff | Resistive-inductive voltage drop on the winding |
| γ | Phase angle between phase current and back electromotive force |
| B | Phase angle between the resistive-inductive voltage drop and the induced back electromotive force |
| A | Phase angle between the resistive-inductive voltage drop and the motor coil current |
| Motor phase | Motor winding |
| Ω | Angular speed of the motor |

As clearly shown by the phasors of FIGS. 3, 4 and 5, in a voltage mode controlled motor the current flowing throughout the windings of the motor is not directly controlled and depends, besides upon the input driving signals that fix the values of KVAL and Torque Optim, also upon other factors such as the load characteristics (resistance and inductance of the stator windings) and upon the value of the back electromotive force BEMF generated by the motor itself, as well as upon the phase angle between the applied voltage and the BEMF of the phases. The torque generated by the motor is not solely determined by the value of the input signal as in current mode drivers.

Typically, the value KVAL is fixed as a function of the desired motor speed, and the value Torque Optim is fixed accordingly to optimize the motor torque once the desired value of speed is established.

Being that the motor torque of a PMSM motor is a function of the phase angle between the stator phase current and the related BEMF induced at the same phase, it may be important in voltage mode systems to have the possibility of controlling the stator current i with respect to the BEMF (on its rotational function of the rotor position), besides its amplitude.

In the known voltage mode driving of FIG. 2, the phase of the voltage Vdiff with respect to the back electromotive force BEMF is a nonlinear function of the amplitude of the voltage Vin, of the amplitude of the BEMF and of the phase angle between the voltages Vin and BEMF. It is relatively easy in steady state conditions, that is, with constant rotation speed and resistive torque, to establish the phase of the voltage Vin with respect to the BEMF for forcing a current in phase with the back electromotive force BEMF, but this is relatively complicated (or realizable with unsatisfactory pass band performances) in non steady state conditions (for example, during torque transient conditions).

FIG. 3a is a simplified electric diagram that illustrates a voltage mode driving implemented with the known device of FIG. 2 wherein a sinusoidal driving voltage Vin in phase with the BEMF (Torque Optim=0) is applied, thus also the resistive-inductive voltage drop Vdiff is in phase with the voltages Vin and BEMF, as shown in the phasor diagram of FIG. 3b. The phase current i through the winding of the motor is out of phase with respect to the voltage Vdiff (and thus with respect to the BEMF in this case) by an angle $\alpha=\arctan(\omega L/R)$ that may be relatively great. The phase angle between the phase current i and the BEMF may be very important for defining the motor torque and the efficiency of the PMSM motor driving, thus it is clear that it is useful to control the phase angle of the voltage Vin with respect to the phase of the BEMF (that is Torque Optim) in order to drive indirectly the phase angle of the voltage Vdiff and thus the phase angle of the current. In other words, by acting on an easily controllable parameter (phase angle of the voltage Vin with respect to the BEMF), a variation of the phase angle between the phase current i and the BEMF is indirectly obtained.

A drawback of this driving technique is that there is not solely a relationship between the phase angle between the voltage Vin and the BEMF and the phase angle between the BEMF and the phase current i. An optimal phase angle value (Torque Optim "optimal") could be obtained, for example, through the calibration procedure or through appropriate calculation carried out by a microcontroller or through look-up table or other method. For ease it is common practice to use a constant phase angle value Torque Optim during the normal functioning of the motor: this ensures good performance in most functioning conditions, in which the motor is in steady state conditions, i.e. with a constant rotation speed and resistive torque.

FIGS. 4a and 4b are similar to FIGS. 3a and 3b and contemplate the case in which the control voltage Vin leads the BEMF (Torque Optimizer=K >0), thus the current i flowing throughout the winding will be in phase with the BEMF (maximum efficiency). In steady-state conditions it is possible to identify a value of constant phase angle Torque Optim at which the maximum efficiency is attained, but it is not so during a transient variation of the load.

As described by the phasors of FIGS. 5a, 5b and 5c respectively before a transient, during a transient that requires an increase of the motor torque and during a transient that requires a reduction of the motor torque, the circuit SPEED CONTROL for controlling the speed may cause a sudden variation of the signal KVAL, causing a variation of the current amplitude (desired effect) and a variation of the phase angle of the current i with respect to the BEMF (undesired effect).

In particular, FIG. 5b shows that, after an increase of the requested motor torque: the control voltage increases (Vin'>Vin); the BEMF has remained almost unchanged with respect to the situation shown in FIG. 5a, because the speed ω of the motor cannot vary instantaneously because of inertia; the phase angle $\alpha=\arctan(\omega L/R)$ between the current i and the resistive-inductive voltage drop Vdiff has remained almost unchanged; the value of the phase angle Torque Optim has remained unchanged; and thus there is an increase of the amplitude of the current i but also a variation (delay) of its phase in respect to the BEMF (γ<0).

Similarly, FIG. 5c shows that, because of a reduction of the requested motor torque: the control voltage decreases (Vin"<Vin); the BEMF has remained almost unchanged with respect to the situation shown in FIG. 5a, for the above reasons; the phase angle $\alpha=\arctan(\omega L/R)$ has remained almost unchanged for the same reasons; the phase angle Torque Optim has remained unchanged; and thus there is a reduction of the module of the current i but also a (positive) variation of its phase angle in respect to the BEMF (γ>0).

In transient conditions, the PMSM motor is not driven in conditions of maximum efficiency.

Having a current flowing throughout the windings of the motor that varies in phase depending on the requested motor torque (KVAL), may be considered, in certain cases, an undesirable limitation.

SUMMARY

Studies carried out by the applicant have led considering the variation of the phase angle of the resistive-inductive drop Vdiff with respect to the BEMF, when the value of the requested torque KVAL varies, a cause of the above mentioned drawback. Indeed, in the known voltage mode drivers, the phase of the voltage Vdiff with respect to the BEMF, being a function of the amplitude of the control voltage Vin, is non constant during a transient increase/decrease of the requested motor torque.

A method of driving has been found, implementable in a related driver of a permanent magnet synchronous electric motor, in which the phase of the current flowing throughout the windings of the motor does not depend upon the value of desired torque. This excellent result may be obtained by controlling directly the resistive-inductive drop Vdiff of a PMSM motor winding through the steps of: sensing or estimating a back electromotive force induced in at least one winding of the motor by the rotation of a rotor of the motor; reading, from a memory, values of a first voltage waveform having a phase angle with respect to the back electromotive force; and generating a driving voltage, as a function of the values read from the memory with the phase angle and of the first coefficient, corresponding to the sum between the values of a control voltage obtained as product of the values of the first voltage waveform by a first coefficient determined as a function of a desired value of motor torque, and values of a cancelation voltage of the back electromotive force. The method may also include applying the driving voltage at the motor winding.

According to an embodiment, implementable in an innovative driver of a permanent magnet synchronous electric motor, the phase voltage is generated through the following operations: determining this phase angle with respect to the back electromotive force as a function of the speed ω of the motor, of the resistance R and of the inductance L of the winding, such as to cause a desired phase angle between a current flowing throughout the winding and the back electromotive force; generating values of the control voltage by multiplying the values of the first voltage waveform by the first coefficient corresponding to the desired value of motor torque; determining a second coefficient corresponding to a value of amplitude of the back electromotive force; reading from the memory values of a second voltage waveform in phase with the back electromotive force; generating values of the cancelation voltage of the back electromotive force by multiplying the second coefficient by the values of the second voltage waveform; and generating the driving voltage as the sum between the control voltage and the cancelation voltage.

According to another embodiment, the phase voltage is generated through the following steps: determining the phase angle with respect to the back electromotive force corresponding to the phase angle with respect to the back electromotive force by determining the sum between the control voltage and the cancelation voltage; determining the first coefficient equal to a value of amplitude of the sum between the control voltage and the cancelation voltage; generating the driving voltage corresponding to the product between the values of the first voltage waveform by the first coefficient.

An innovative driver of a permanent magnet synchronous electric motor is also disclosed.

BRIEF DESCRIPTION OF THE DRAWINGS

FIG. 8 shows a driver of a PMSM motor that implements the embodiment of the method of this disclosure schematically depicted in FIG. 6a.

FIG. 9 shows another driver of a PMSM motor that implements another embodiment of the method of this disclosure equivalent to that schematically illustrated in FIG. 4a.

DETAILED DESCRIPTION

In this specification the case of a sinusoidal control voltage Vin will be considered, though this particular voltage waveform is just an example, since it is possible to use voltage waveforms as disclosed in U.S. Pat. Nos. 6,137,253 or 7,834,568 in the name of the same applicant, or of any other type adapted to generate sinusoidal or pseudo-sinusoidal (i.e. that approximate a sinusoid) currents through the motor windings.

The method of this disclosure performs a direct driving of the resistive-inductive drop Vdiff, instead of driving the voltage Vin=Vdiff+BEMF, as in the known device of FIG. 2. This allows a direct driving of the phase angle of the current i in respect to the BEMF and thus to emulate the functioning of a current mode driver further having a null current for a null value of KVAL, which is another typical advantage of current mode driving systems. Indeed, in a driving mode as the mode disclosed herein, a null KVAL causes a null current as typically occurs in current mode systems and does not generate an inversion of the current throughout the windings (braking current), as by contrast occurs in a classic voltage mode driving. Moreover, this is obtained without realizing closed loop control circuits, with consequent stability problems associated therewith. This characteristic makes the driving method of this disclosure not only simpler and more economical with respect to a traditional current mode driving, but also improves performances from the point of view of the linearity of the motor torque, as will be described hereinafter.

Figure 6A:
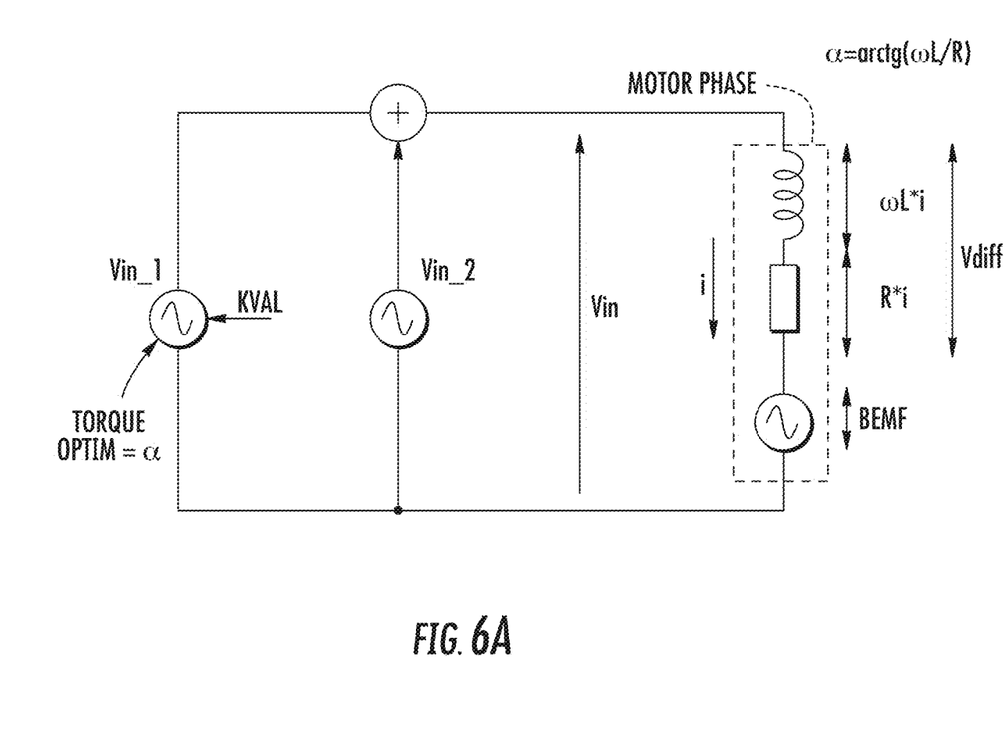
FIGS. 6a and 6b show respectively a basic electric scheme of a driver that implements an embodiment of the method of this disclosure and a related phasor diagram, wherein the current i through the winding is always in phase with the induced BEMF (maximum efficiency).
Figure 6B:
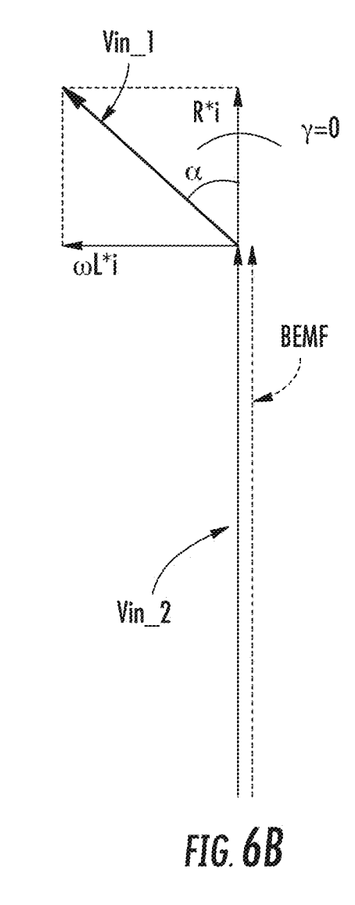

A first embodiment of the method is schematically described by the electric circuit of FIG. 6a and by the related phasor diagram of FIG. 6b. By acting such as to make the driving voltage applied at the winding correspond to the control voltage Vin=Vin_1+Vin_2, and given that Vin_2=BEMF then Vin it is possible to control directly the resistive-inductive drop Vdiff through the control voltage Vin_1. According to the herein disclosed method, the value KVAL, corresponding to the motor torque to be delivered, and the value Torque Optim, that determines the phase difference between the voltage Vin_1 and the BEMF, act on the voltage Vin_1 to drive the amplitude and the phase of the voltage Vdiff. The current lags the voltage Vdiff by a factor dependent only on the motor speed (constant, if the speed is constant), and the amplitude of the current is a function of the amplitude of the voltage Vdiff, of the RL load characteristics (constant value) and of the motor speed (known value). Thus it is possible to control precisely the current indirectly, that is without direct sensing, by driving the amplitude and phase of the voltage Vin_1. Once having found the value Torque Optim to generate the desired phase angle of the current i with respect to the BEMF (for example in phase with the BEMF, if the maximum efficiency is desired), this phase relation does not change when the value of KVAL is varied.

Figure 7A:
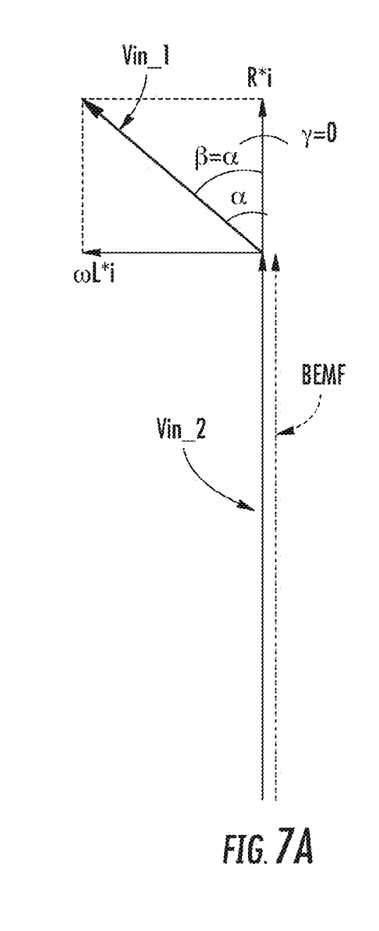
FIGS. 7a, 7b and 7c show phasor diagrams that describe an embodiment of the method of the invention in the same stationary and transient conditions of the diagrams of FIGS. 5a, 5b and 5c.
Figure 7B:
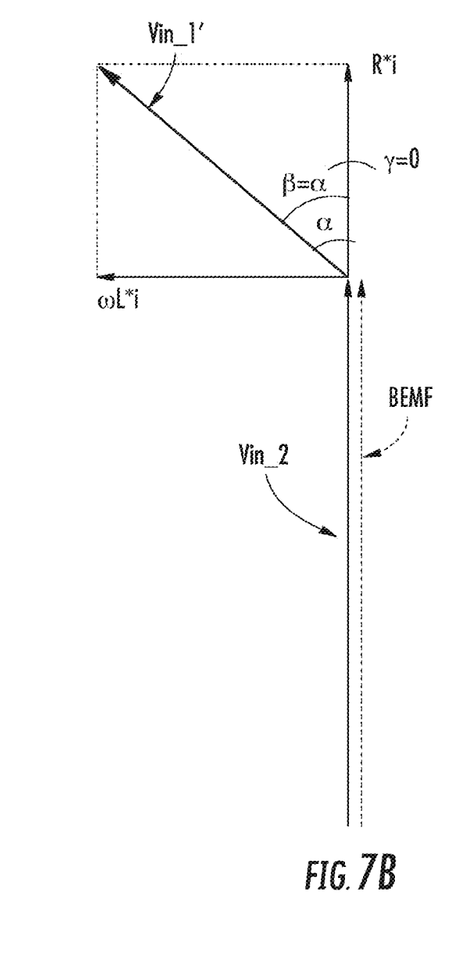
Figure 7C:
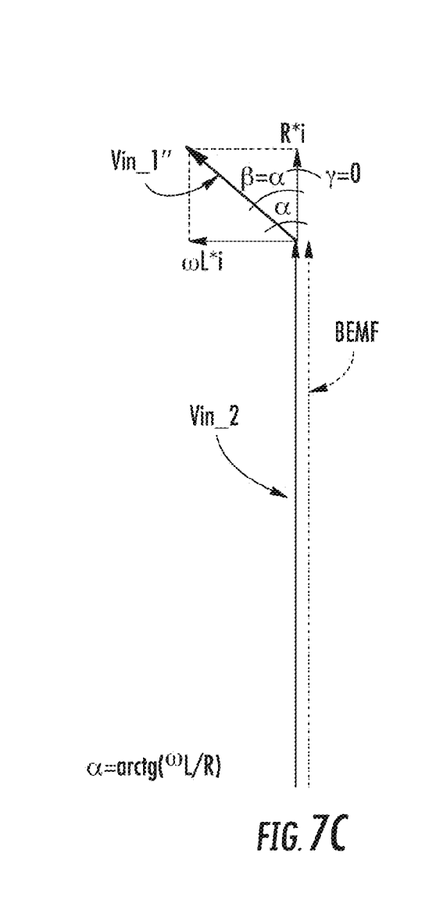

FIGS. 7a, 7b and 7c are phasor diagrams obtained in the same stationary and transient conditions that, in the driver of FIG. 2, generate voltages and currents represented with the phasor diagrams of FIGS. 5a, 5b and 5c, respectively. What has been stated referring to FIGS. 5a, 5b and 5c applies similarly to the diagrams of FIGS. 7a, 7b and 7c with the evident difference that the current i throughout the windings remains in phase with the BEMF also during the transients even by keeping unchanged the value Torque Optim.

The amplitude of the cancelation voltage Vin_2 of the back electromotive force BEMF may be calculated (BEMF=Kt*ω), starting from the speed ω of the motor and of its torque constant Kt, and its phase may be determined by monitoring the zero-crosses of the BEMF. As an alternative, with a circuit that generates an analog or digital replica signal of the BEMF, it is possible to determine the cancelation voltage Vin_2 using this replica signal.

Figure 8:
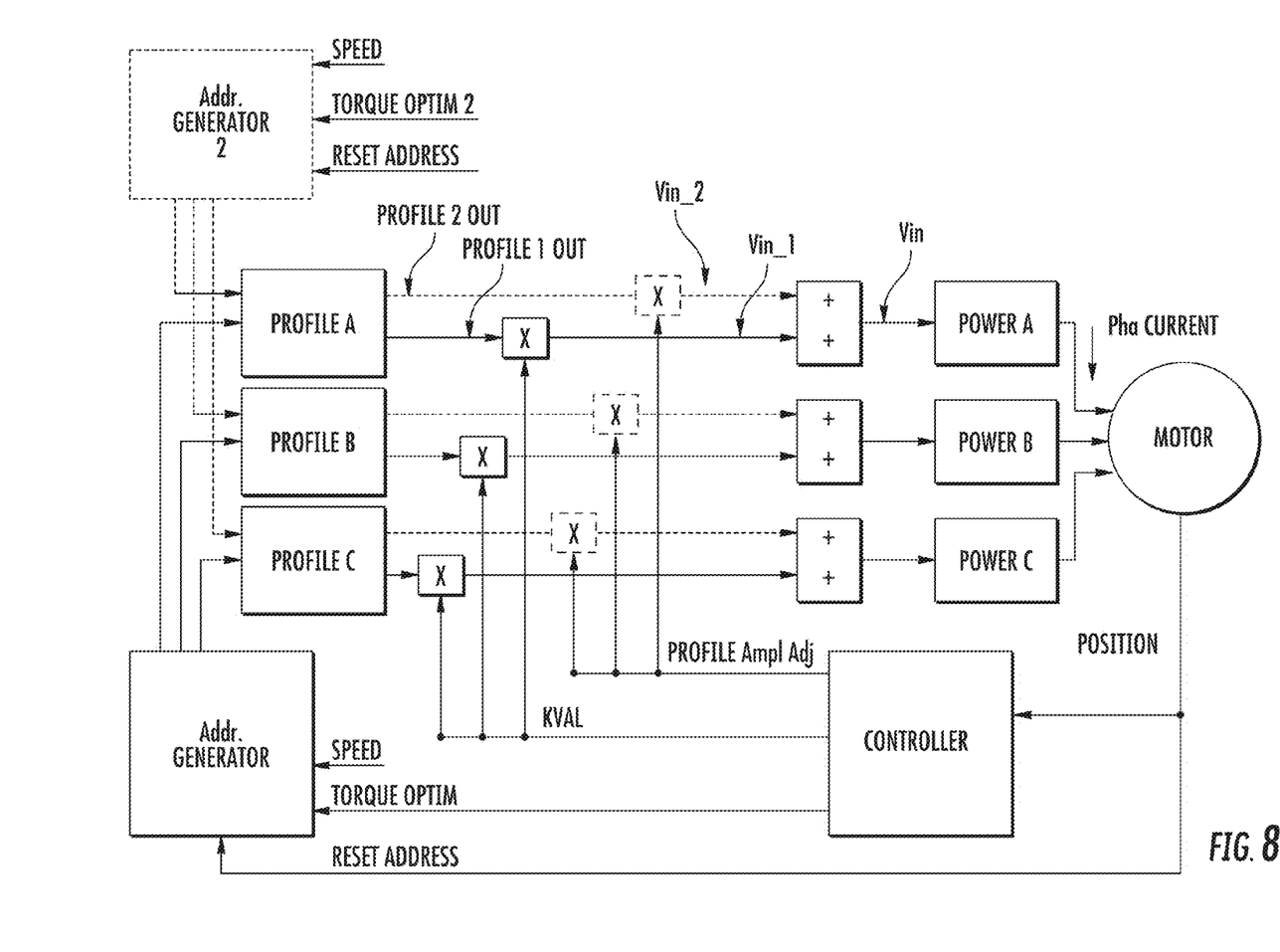

FIG. 8 depicts a simplified block diagram of an architecture according to the present embodiments wherein the parts are adapted to generate sinusoidal (or more generally periodic) voltages Vin_1 and Vin_2. The blocks Profile A, Profile B, Profile C are memory devices (or any other type adapted to generate periodic waveforms) suitable for generating periodic signals of pre-defined amplitude and frequency established by the scanning frequency of the addresses generated by the signal delivered by the block Address Generator. Each block Profile A, Profile B, Profile C is capable of delivering two phase-independent voltage waveforms Profile1_Out and Profile2_Out. The phase of Profile1_Out, function of the signal Reset Address Value 1, will influence directly the phase angle of the current (with respect to the BEMF), and the phase angle of the waveform Profile_2, that is a function of the signal Reset Address Value 2, will make the waveform Profile2_Out in phase with the BEMF.

The waveform Profile2_Out is then amplitude-modulated by a factor ProfileAmplAdj adapted to make Vin_2=BEMF; the waveform Profile1_Out instead is modulated in order to control the amplitude of the current i. Indeed, given that the voltage Vin_1 is directly proportional to the value KVAL of the motor torque to be provided and given that, at a constant speed, the impedance of the winding is constant, it is thus possible to control directly the current by controlling the value KVAL.

Figure 9:
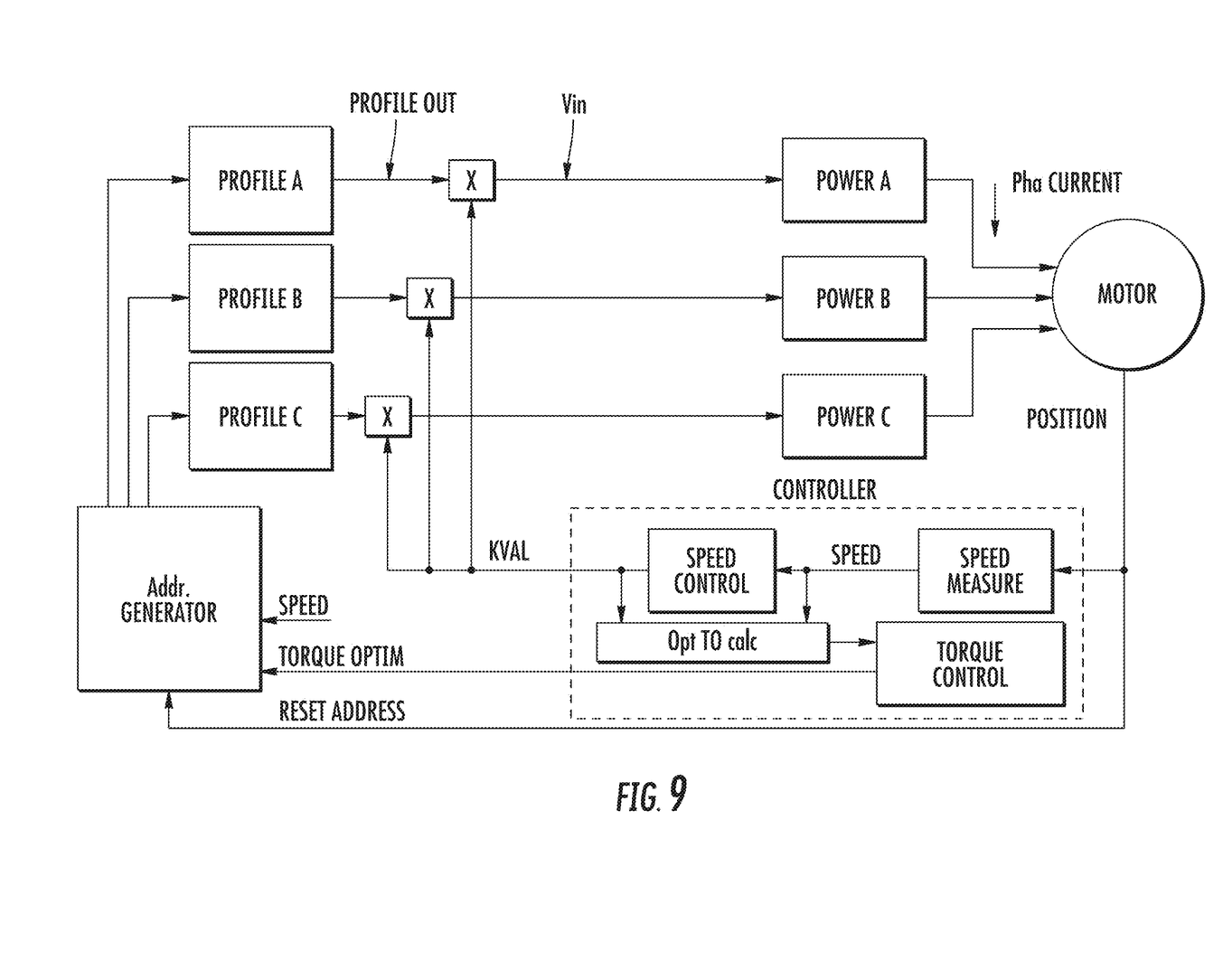

FIG. 9 depicts a simplified block scheme of an architecture similar to the known architecture of FIG. 2, in which, though, the controller CONTROLLER carries out different operations with respect to the controller of FIG. 2. The block SPEED CONTROL receives as an input information about the present speed SPEED of the motor and, knowing the nominal values of inductance L and of resistance R of the winding, determines the value KVAL such as to correspond to the amplitude of the sum between the control voltage Vin_1, that will determine the desired motor torque to be delivered, and the cancelation voltage Vin_2. The functional block OPT TO CALC, starting from the measured speed SPEED and from the value KVAL, will determine the phase angle, with respect to the back electromotive force, of the sum between the control voltage Vin_1 and the cancelation voltage Vin_2, and will provide this information to the block TORQUE CONTROL that will generate the signal Torque Optim for reading, from the memory, values of a voltage waveform with the desired phase angle with respect to the back electromotive force. The periodic signal ProfileOut read from the memory is amplitude-modulated by a factor equal to KVAL for generating the signal Vin that corresponds to the driving voltage of the motor winding.

Figure 10A:
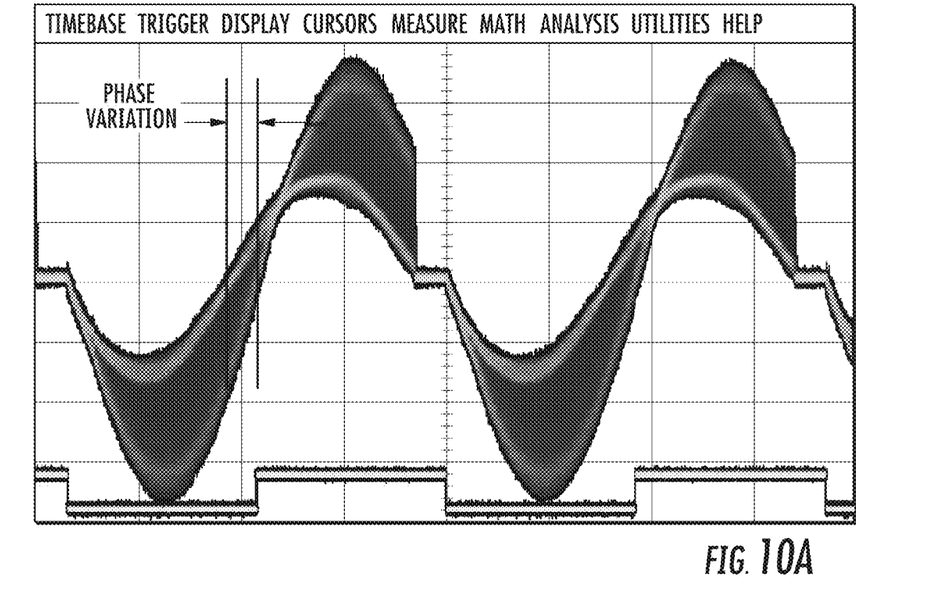
FIGS. 10a and 10b show time graphs of currents of a motor phase (PhA Current) obtained in transient condition using respectively a known driver of FIG. 2 and a driver according to the present disclosure.
Figure 10B:
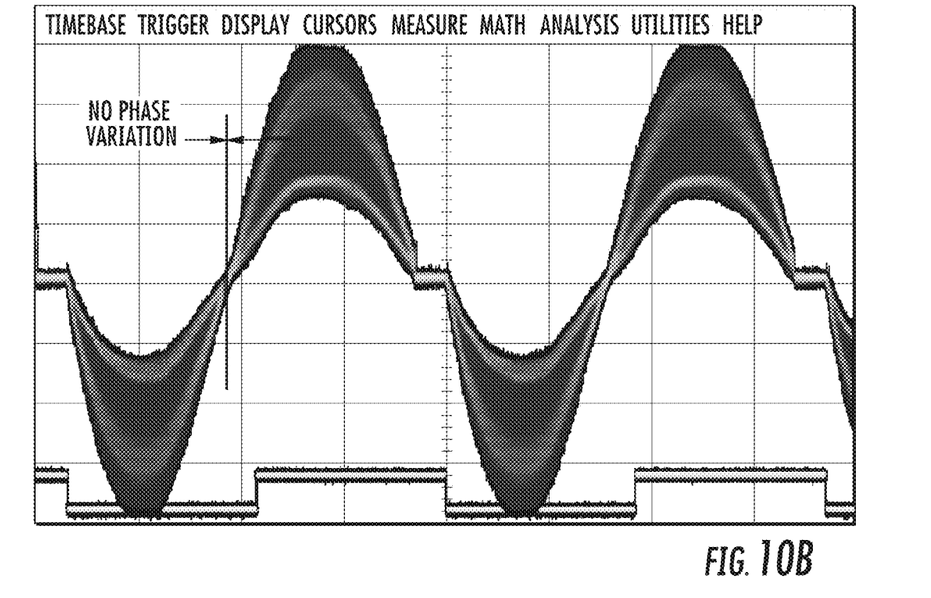

FIGS. 10a and 10b show exemplary graphs of the currents PhA Current throughout a winding A, obtained in transient conditions using respectively a known voltage mode driving (FIG. 2) and the device of FIG. 8 or 9 according to the present disclosure, that prove the effectiveness of the driving method of the present disclosure. The figures have been obtained by varying the load applied to the motor, the speed of which is regulated at a fixed value. The figures have been obtained using the "infinite persistence" mode of the measuring instruments, that allows display of the signal during the whole transient evolution. The phase of the current in the prior art system undergoes great variations in correspondence with different amplitudes of the current using the driving method of this disclosure.

Figure 11:
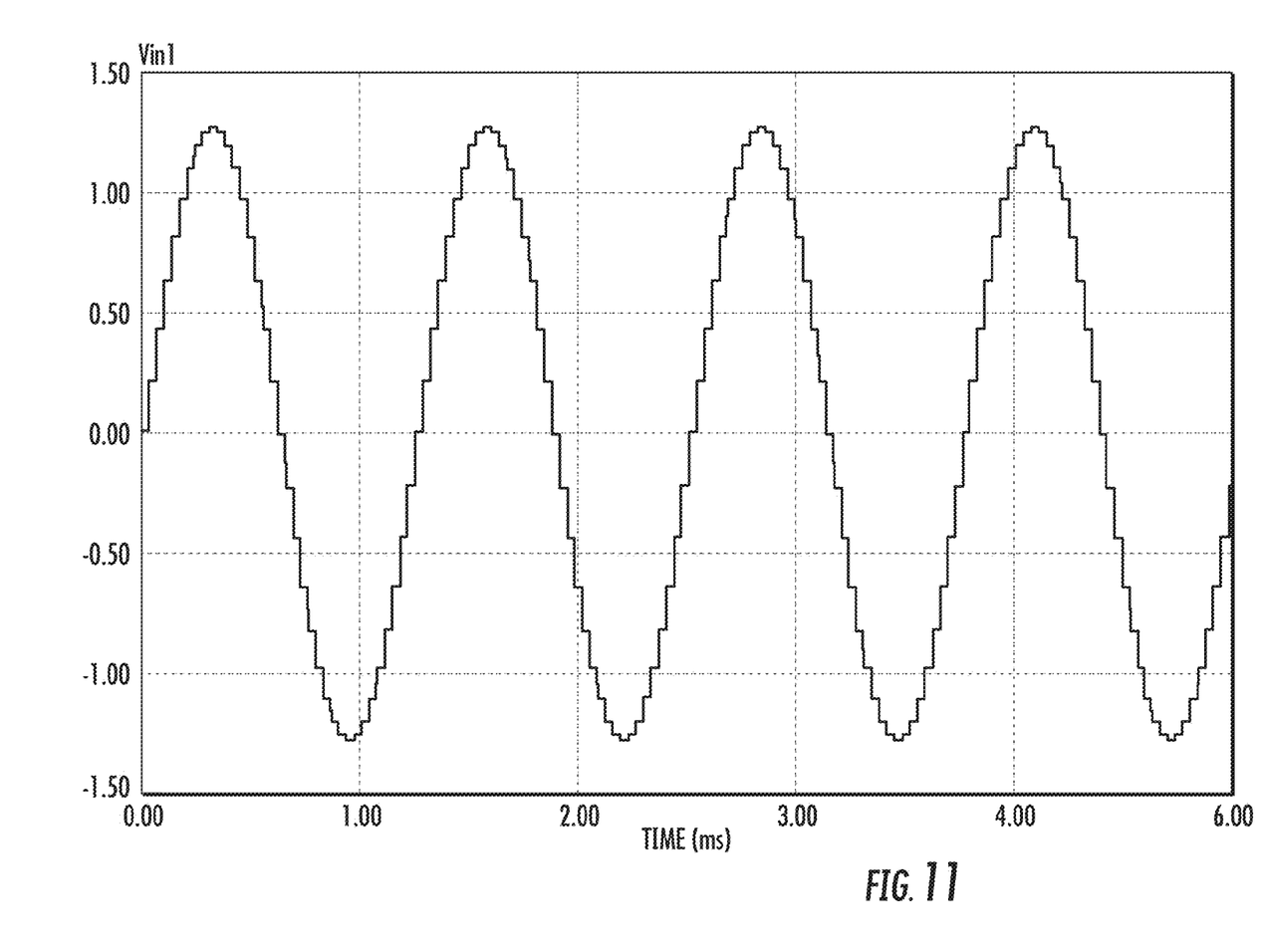
FIG. 11 is an exemplary time graph of a voltage waveform read from the memory generated by the block Profile A in FIG. 8 or 9.

FIG. 11 shows an exemplary digital signal generated by one of the blocks Profile A, B or C. In the example the waveform is a step sinusoid, though any other type of periodic signal may be used. The waveform is quantized (using 36 samples in the depicted case), thus a current mode driver will tend to generate an output current with the same step variation of the quantized control waveform, thus generating high frequency micro-variations of the torque and consequently undesirable micro-vibrations.

Figure 12A:
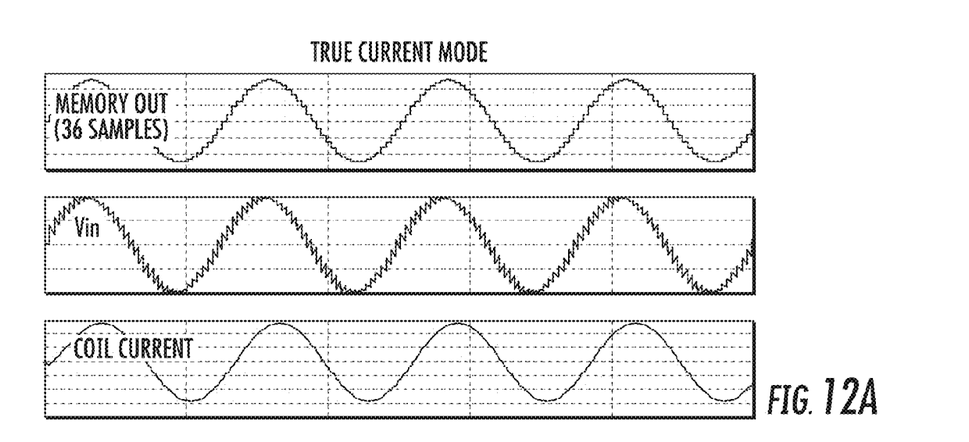
FIGS. 12a and 12b are time graphs of the voltage waveforms read from the memory, of the applied phase voltages and of the absorbed phase currents in a driving mode respectively in current mode and in voltage mode using the method of this disclosure.
Figure 12B:
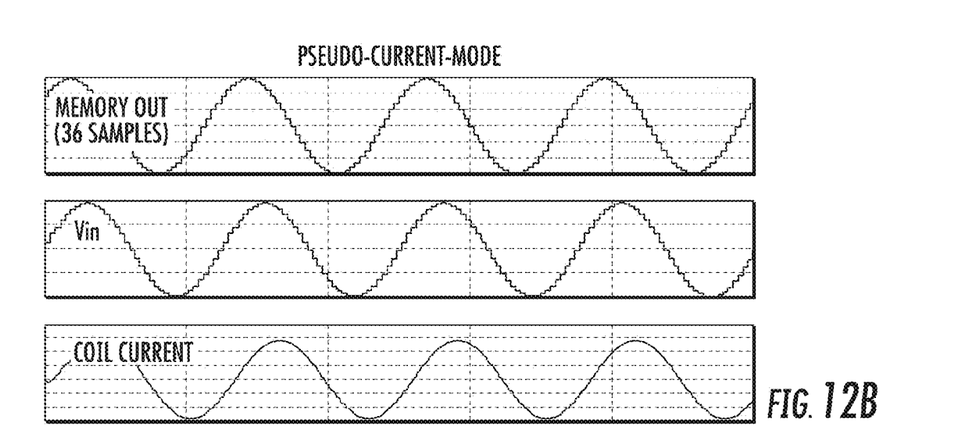
Figure 13:
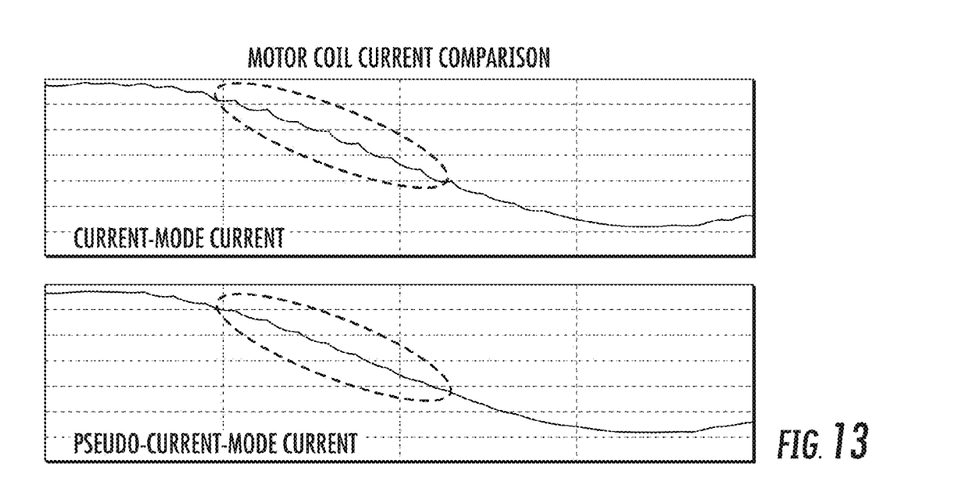
FIG. 13 compares time graphs of phase currents in transient conditions absorbed by a current mode driver and by a voltage mode driver that implements the method of this disclosure.

The driving technique of this disclosure is not affected by this drawback because the current i forced throughout the winding does not have the discontinuities of the quantized waveform, because the inductance of the winding acts as a low-pass filter, as shown in FIGS. 12a and 12b. FIG. 12a shows the waveform, in this example a sinusoid, stored in the memory (Memory Out), the voltage on the terminals of the motor winding (Vin) and the current flowing (Coil current) throughout the winding of the motor in a current mode driving (True Current mode). FIG. 12b shows the sinusoidal waveform stored in the memory (Memory Out), the voltage on the motor winding (Vin) and the current flowing throughout the winding of the motor while driving according to the present disclosure (Pseudo-current mode). FIG. 13 is a detailed view comparing the two currents obtained using the two methods. The current i obtained with the driving method of the present disclosure (Pseudo-current mode) has a smaller ripple than the current (Current-mode current) obtained with a classic current mode driving, thus the generated motor torque will be less subjected to undesired micro-variations.

The present disclosure allows improvement of the driving system for PMSMs (Permanent Magnet Synchronous Motors), typically used as spindle motors in hard disks, CD, DVD, etc. In particular, the present disclosure allows driving the PMSM motor in a voltage mode with sinusoidal (or pseudo-sinusoidal) current waveforms having a phase relation, with respect to the reference signal (that may typically though not necessarily be the BEMF), that may be directly controlled without using current sensors and without the need of realizing a closed loop control. This allows obtaining performances similar to those of a current mode driving, though using simpler and lower cost circuits and reducing or preventing stability problems associated with closed-loop control schemes.

With the present disclosure it is also possible to prevent the inversion of polarity of the current throughout the windings, as occurs in traditional voltage mode controls when the voltage applied at the windings is smaller than the BEMF value.

The invention claimed is:

1. A method of driving a permanent magnet synchronous electric motor having a plurality of windings and a rotor associated therewith, comprising:
sensing or estimating a back electromotive force induced in at least one winding by rotation of the rotor;
reading, from a memory, values of a first voltage waveform having a phase angle with respect to the back electromotive force;
generating a driving voltage corresponding to a sum of values of a control voltage, obtained as a product of the values of the first voltage waveform by a first coefficient determined as a function of a desired value of motor torque, and values of a cancelation voltage of the back electromotive force; and
applying the driving voltage to the at least one winding.

2. The method of claim 1, wherein the driving voltage is generated by at least:
determining a phase angle ($\beta$) with respect to the back electromotive force as a function of motor speed $\omega$, of a resistance R and inductance L of the at least one winding, such as to cause a desired phase angle between a current flowing throughout the at least one winding and the back electromotive force;
generating values of the control voltage by multiplying the values of the first voltage waveform by the first coefficient;
determining a second coefficient corresponding to a value of an amplitude of the back electromotive force;
reading, from the memory, values of a second voltage waveform in phase with the back electromotive force;
generating values of the cancelation voltage of the back electromotive force, by multiplying the second coefficient by the values of the second voltage waveform in phase with the back electromotive force; and
generating the driving voltage as the sum between the control voltage and the cancelation voltage.

3. The method of claim 2, wherein the phase angle ($\beta$) is equal to $\arctan(\omega L/R)$.

4. The method of claim 1, wherein the driving voltage is generated by at least:
determining a sum between the control voltage and the cancellation voltage, and determining a phase angle between the sum and the back electromotive force;
determining said first coefficient, equal to a value of an amplitude of the sum between the control voltage and the cancelation voltage; and
generating the driving voltage corresponding to a product between the values of the first voltage waveform by the first coefficient.

5. The method according to claim 1, wherein the first voltage waveform comprises a sinusoidal voltage waveform.

6. A method of driving an electric motor having a plurality of windings and a rotor associated therewith, comprising:
determining a back electromotive force induced in at least one winding by rotation of the rotor;
reading, from a memory, values of a first voltage waveform having a phase angle with respect to the back electromotive force;
generating a driving voltage based upon values of a control voltage, obtained from the values of the first voltage waveform and a first coefficient determined as a function of a desired value of motor torque, and values of a cancelation voltage of the back electromotive force; and
applying the driving voltage to the at least one winding.

7. The method of claim 6 wherein determining the back electromotive force comprises sensing the back electromagnetic force.

8. The method of claim 6 wherein determining the back electromotive force comprises estimating the back electromagnetic force.

9. The method of claim 6, wherein the driving voltage is generated by at least:
determining a phase angle ($\beta$) with respect to the back electromotive force as a function of motor speed $\omega$, of a resistance R and inductance L of the at least one winding, such as to cause a desired phase angle between a current flowing throughout the at least one winding and the back electromotive force;
generating values of the control voltage by multiplying the values of the first voltage waveform by the first coefficient;
determining a second coefficient corresponding to a value of an amplitude of the back electromotive force;
reading, from the memory, values of a second voltage waveform in phase with the back electromotive force;
generating values of the cancelation voltage of the back electromotive force, by multiplying the second coefficient by the values of the second voltage waveform in phase with the back electromotive force; and
generating the driving voltage as the sum between the control voltage and the cancelation voltage.

10. The method of claim 9, wherein the phase angle ($\beta$) is equal to $\arctan(\omega L/R)$.

11. The method of claim 6, wherein the driving voltage is generated by at least:
determining a sum between the control voltage and the cancellation voltage, and determining a phase angle between the sum and the back electromotive force;
determining said first coefficient, equal to a value of an amplitude of the sum between the control voltage and the cancelation voltage; and
generating the driving voltage corresponding to a product between the values of the first voltage waveform by the first coefficient.

12. The method according to claim 6, wherein the first voltage waveform comprises a sinusoidal voltage waveform.

13. A device for driving a permanent magnet synchronous electric motor having a plurality of windings and a rotor associated therewith, comprising:
a feedback circuit configured to sense or estimate a back electromotive force induced in at least one winding by rotation of the rotor;
a memory adapted to store values of a first voltage waveform;
a control circuit configured to
read sequentially from said memory the values of the first voltage waveform having a phase angle with respect to the back electromotive force, and
determine a first coefficient as a function of a desired value of motor torque;
a first multiplying circuit configured to generate values of a control voltage obtained as a product of the values of the first voltage waveform by the first coefficient; and
a power stage coupled with said control circuit, configured to apply, at the at least one winding, a driving voltage corresponding to a sum of the control voltage and a cancelation voltage of the back electromotive force.

14. The device of claim 13, wherein said control circuit is configured to determine a second coefficient corresponding to a value of an amplitude of the back electromotive force, and to read, from said memory, values of a second voltage waveform in phase with the back electromotive force.

15. The device of claim 14, further comprising a second multiplying circuit configured to generate values of the cancelation voltage of the back electromotive force by multiplying the second coefficient by the values of the second voltage waveform.

16. The device of claim 15, further comprising an adder configured to generate values of a sum of the control voltage and the cancelation voltage, and to provide the values of the sum to said power stage.

17. A device for driving an electric motor having a plurality of windings and a rotor associated therewith, comprising:
- a circuit configured to determine a back electromotive force induced in at least one winding by rotation of the rotor;
- a memory adapted to store values of a first voltage waveform;
- a control circuit configured to
  - read, from said memory, values of the first voltage waveform having a phase angle with respect to the back electromotive force, and
  - generate a driving voltage based upon values of a control voltage, obtained from the values of the first voltage waveform and a first coefficient determined as a function of a desired value of motor torque, and values of a cancelation voltage of the back electromotive force; and
- a power stage configured to apply the driving voltage to the at least one winding.

18. The device of claim 17 wherein said circuit is configured to determine the back electromotive force based upon sensing the back electromagnetic force.

19. The device of claim 17 wherein said circuit is configured to determine the back electromotive force based upon estimating the back electromagnetic force.

20. The device of claim 17, wherein said control circuit is configured to determine a second coefficient corresponding to a value of an amplitude of the back electromotive force, and to read, from said memory, values of a second voltage waveform in phase with the back electromotive force.

21. The device of claim 20, further comprising a second multiplying circuit configured to generate values of the cancelation voltage of the back electromotive force by multiplying the second coefficient by the values of the second voltage waveform.

22. The device of claim 21, further comprising an adder configured to generate values of a sum of the control voltage and the cancelation voltage, and to provide the values of the sum to said power stage.

* * * * *